June 23, 1970 R. H. LAPUYADE 3,517,295
CHARGING DEVICE FOR ELECTROCHEMICAL GENERATORS
Filed Sept. 21, 1967 6 Sheets-Sheet 1

INVENTOR
ROBERT HENRI LAPUYADE
BY
Kenyon & Kenyon
ATTORNEYS

INVENTOR
ROBERT HENRI LAPUYADE
BY
ATTORNEYS

INVENTOR
ROBERT HENRI LAPUYADE
BY
ATTORNEYS

INVENTOR
ROBERT HENRI LAPUYADE
BY
ATTORNEYS

INVENTOR
ROBERT HENRI LAPUYADE

United States Patent Office 3,517,295
Patented June 23, 1970

3,517,295
CHARGING DEVICE FOR ELECTROCHEMICAL GENERATORS
Robert Henri Lapuyade, Enghien-les-Bains, France, assignor to Societe Des Accumulateurs Fixes et de Traction (Societe Anonyme), Romainville, France, a company of France
Filed Sept. 21, 1967, Ser. No. 669,438
Claims priority, application France, Sept. 26, 1966, 77,648; May 26, 1967, 108,147; Aug. 5, 1967, 105,606
Int. Cl. H02j 7/02
U.S. Cl. 320—32          26 Claims

ABSTRACT OF THE DISCLOSURE

Charging devices for electrochemical generators of lead acid or other types enabling their operation in a practically sealed state, the charging being effected in a programmed manner to provide delivery initially of full charging current to a discharged battery with subsequent automatic reduction thereof as the battery becomes charged and either complete cut-off or else trickle charge maintenance when the battery has become fully charged to maintain it in such state during idling or storage, the devices being supplied by rectified and filtered alternating current and including at least two parallel connected circuits connected to the rectified power source, a first of the circuits supplying charging current to the electrochemical generator via the emitter-collector path of a first transistor, and the second circuit comprising the emitter-collector path of a second transistor, the first transistor being biased by a first voltage varying during charging of the generator as a function of the variable voltage taken at the terminals of the generator and applied to its emitter and upon a second variable voltage taken from a point of the second circuit parallel connected to the first circuit and applied to said first transistor base so that the apparent resistance of said first transistor varies during charging of the generator, the second transistor being biased across its emitter and its base by a voltage dependent upon the intensity of the charging current so that a swing of said second transistor from one extreme operating state to another occurs as soon as the intensity of the charging current falls below a predetermined critical value, an interconnecting circuit being provided so that the swinging of the second transistor correlatively causes the first transistor to swing towards a condition of very high or infinite apparent resistance due to the sharp modification of the reference voltage applied to the base of said first transistor, and, optionally, including a trickle charge circuit to permit trickle charging of the battery after charging thereof has been completed to compensate for self-discharge of the battery during idling or storage.

BRIEF SUMMARY OF INVENTION

This invention relates to programmed charging devices for electrochemical generators such as storage batteries and rechargeable primary batteries and preferably, but not exclusively lead-acid storage batteries, from rectified and filtered power, as supplied from alternating current power mains.

It is well known that any conventional battery, be it filled with aqueous acid or alkaline electrolyte, progressively tends to lose the water contained in this aqueous electrolyte either by evaporation or by electrolysis, principally at the end of charge, when the charging chemical reactions at the electrodes are over and the electrolysis of either the acid or alkaline electrolyte begins. Consequently, water has to be replaced in order to maintain the electrolyte level above a safety level.

A remedy has been suggested to avoid such a compulsory maintenance by controlling the causes of the progressive loss of the water contained in the electrolyte.

A rather attractive means consists in using sealed cells whereby evaporation losses are practically suppressed. Moreover, with such sealed cells there is no ejection of electrolyte particles that are injurious to health and corrosively attack all surrounding metal parts which are sometimes of very fragile character.

However, even here at the end of charge electrolysis still occurs and as a result essentially water must always be periodically added. In addition, pressure builds up inside the sealed container as gases are evolved because of electrolysis.

In order to suppress this last drawback, semi-sealed cells have been designed wherein the internal space is permanently in communication with the atmosphere through a very small vent that is provided to limit the pressure rise inside the container while more or less lowering the evaporation losses.

It has also been proposed to provide cells with suitable valves opening when the internal pressure reaches defined values.

Since the problem consists in suppressing both evaporation losses and electrolysis losses, the ideal solution would consist in making sealed cells wherein no electrolysis occurs at the end of charge or during overcharge. Such a result has been obtained in some alkaline cells by means of internal arrangements such as a decrease of plate thicknesses and of spacing between plates, and the use of electrode carriers made of sintered nickel powder impregnated with active material.

But in the most common case, more especially with lead-acid storage batteries which are the most commonly used batteries, the only way to prevent electrolysis at the end of charge is to control the charging process itself.

One of the means for permitting a conventional battery such as a lead-acid battery to operate with a minimum loss of water by electrolysis, consists in charging it so that the voltage never reaches the value required for the decomposition of the electrolyte solution by electrolysis when the charging chemical reactions are completed on the active materials. Provided that the battery is associated with a charging apparatus which strictly complies with this impertive condition, such batteries can be sealed since practically no refilling is ever needed.

In the particular case of a lead-acid battery, an already-known quick charge process to be applied to batteries whose state of charge is not known can be used.

As the first step, the charging current is constant and limited to a value $I_{max}$ which, for instance, in the case of a lead-acid battery, expressed in amperes, must not exceed a maximum comprised between C/5 and C/10, C being the capacity expressed in ampere hours (it is well known that too high a charging rate can be detrimental to a lead acid battery even in a fully discharged state) until the terminal voltage of the battery has reached a defined value.

As a second step, the charging voltage is maintained constant (or slightly decreasing) at a first plateau $V=V1$. As the battery becomes charged, the charging current is found to decrease. Thus, the state of charge of this battery is indicated by the value of the current.

When the current has dropped to a predetermined critical value, which, for instance, in the case of a lead-acid battery is about C/50, C being the capacity in ampere-hours, the battery is assumed to be practically fully charged. Then, as a third step, the charging voltage is dropped from the first plateau to a second plateau $V=V_2$ sufficient to ensure only a trickle charge at a low rate without any risk of overcharge.

In another embodiment, the third step may be effected at a constant current $I_e$.

The said critical value of the charging current varies according to the type of generator and can be experimentally determined. This value can advantageously be defined as that when a sharp rise of the voltage occurs at at least one electrode, indicating the start of gas evolution on the said electrode. In the case of a lead-acid battery, it can also be defined as that when the divalent lead concentration in the electrolyte becomes negligible. A device permitting the charge of a storage battery in a fully automatic manner according to the above-described method has already been partially disclosed in the French Pat. No. 1,313,915, filed by the applicant's assignee (no corresponding U.S. Patent).

This device has led to very satisfactory results with high capacity stationary batteries but is, however, too complex, heavy and bulky for small batteries, especially those incorporated into portable, self-contained apparatuses especially when their charging devices are to be incorporated therein.

An object of the invention is a novel device designed for effecting a fully automatic programmed charge, according to the steps described above, and having the advantage both of simplicity and light weight.

Thus, a self-contained, small sized and portable charging device can be provided simply and cheaply to supply charging devices for batteries of apparatuses such as radio sets, television sets, electric tooth brushes, tools, toys and other portable battery-operated mechanisms.

These devices according to the invention may also be used for automatically charging alkaline storage cells of various types such as silver-zinc, silver-cadmium, nickel-zinc, or nickel-cadmium. They may also be used for charging primary cells of rechargeable types such as alkaline, manganese dioxide-zinc cells or analogous types of cells. They may more particularly be used for charging electrochemical generators whose maintenance requirements are very reduced owing to the very small consumption of water.

For this purpose, the invention makes use of the principles already described in the said French Pat. No. 1,313,915, relating to a constant voltage battery charger, more particularly intended for a lead-acid battery, such principle consisting in deriving information as to the state of charge of the battery from the charging current itself, in order either to monitor automatically the charge of a constant charging voltage to another constant charging voltage of a different value as soon as the charging current drops to a determinal critical value (and particularly to monitor the change of the charging voltage to a lower charging voltage as soon as the current drops to the said critical value), or to monitor the change from a charge at a constant voltage to a charge at a constant current as soon as the charging current drops to a determined value (and particularly to monitor the change of the charging current from the critical value to a lower value).

According to the invention, the rectified and filtered current is sent into at least two circuits, viz. a first circuit feeding the electrochemical generator through the emitter-collector path of a first transistor and a second circuit parallel-connected to the first circuit and comprising the emitter-collector path of a second transistor, the first transistor being biased by a first voltage varying during the charge as a function, first, of the variable voltage at the electrochemical generator terminals and applied to its emitter, and secondly, of a second voltage, applied to its base so as to ensure the charge of the generator successively under constant current, then under constant voltage, and the second transistor being biased by a voltage depending on the value of the charging current so as to swing from one operating state to the other state as soon as the current reaches the said critical value, and also to monitor the first transistor either to a slightly conductive state or to the cut-off state.

In the first case, the normal constant voltage charge is switched on to a trickle charge at a lower constant voltage.

In the second case, according to an embodiment, by the means of a resistance, the normal constant voltage charge is switched on to a trickle charge at constant current.

According to another embodiment, no particular device is provided to ensure a trickle charge.

According to the invention, the charging device comprises an auxiliary circuit parallel-connected to the first two circuits and including a diode series-connected with a resistor, the voltage drop of the said diode added to the voltage drop through the whole or part of the resistor included in the first circuit being used to bias the second transistor.

The use of this diode has, as will be seen hereafter, the following three advantages: to dispense with an oversize second transistor, to lower the value of the resistance in the first circuit, which has an adverse effect when the charger delivers its maximum output, and to ensure a compensating effect on the temperature influence with regards to the electrical characteristics of the second transistor.

According to another embodiment, the second transistor is supplied through a circuit comprising a tell-tale lamp or signal series connected to a resistor.

According to another embodiment, a condenser is parallel-connected between the emitter and the collector of the second transistor in order to ensure at the start of charging the switch-on or triggering into operative condition of the first transistor followed by the switch-on of the second transistor.

Alternatively, the condenser may be omitted by connecting the base of the first transistor through a resistor to one output terminal of the rectified filtered power source.

According to another embodiment, the first transistor instead of being constituted by one unit which should have a very high gain, is constituted by a set of two transistors, i.e. a middle gain transistor and a low power transistor connected in the so-called Darlington circuit. Such a circuit has a high current gain and is economically more interesting.

According to yet another embodiment, the emitter of the first transistor is connected to one of the output terminals of the rectifier (negative terminal in the case of a p-n-p transistor) through a suitable resistor admitting the passage of a low trickle current, even when the said transistor is turned off. Such a disposition is particularly recommended when batteries are stored in the charged state since it is possible to compensate for the losses due to local chemical and electrochemical actions resulting in the slow discharge of the battery during its storage or idling as it is well known. Batteries stored according to this invention can thus always be put in immediate use with full charge.

According to still another embodiment, the first transistor is shunted across its emitter and its collector by a resistor acting in the same way as described hereabove.

Other objects and features of the invention will become apparent from the following detailed description in conjunction with the accompanying drawings forming part hereof, and wherein.

Figure 1:
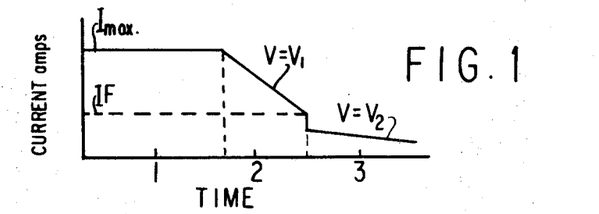
FIG. 1 is a curve illustrating one charging process.

Referring to the drawing, FIG. 1 illustrates the first and second steps referred to hereinabove wherein the charging current is constant and limited to a value $I_{max}$ expressed in amperes plotted to show the value of charging current against time. As a first step, the charging current is constant and limited to a value $I_{max}$ which, for example, in the case of a lead-acid battery, expressed in amperes, must not exceed a maximum between C/5 and C/10, C being the battery capacity in ampere hours. In the first step or period, during charging $I=I_{max}$. In the second step or period, during charging the charging voltage is maintained either constant or slightly decreasing at a first plateau $V=V_1$. As the battery becomes charged, the charging current decreases to $I_F$ along the first sloping line of FIG. 1, thus the state of charge of the battery is denotable by the value of the charging current.

When the charging current has dropped to a predetermined critical value $I_F$ which occurs at the end of the second period, and is for instance in the case of a lead-acid storage battery at about C/50, the battery is assumed to be fully charged.

Then, as a third step or period, the charging voltage is dropped from the first plateau to a second plateau $V=V_2$ where I is below $I_F$, thus insuring a trickle charge only to the battery without any risk of overcharge and serving to maintain the battery in its fully charged state even during idle or storage.

Figure 2:
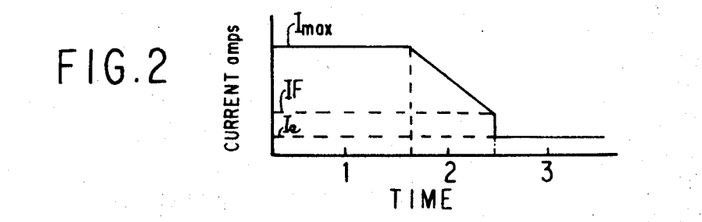
FIG. 2 is a curve illustrating another charging process.

FIG. 2 illustrates the same type of charging wherein the third stage or period may be effected at a constant current $I_e$.

Figure 3:
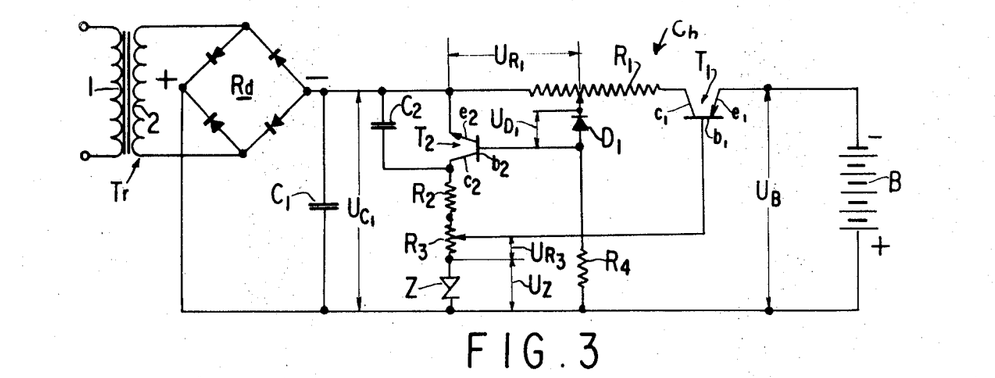
FIG. 3 diagrammatically shows an example of a charging device according to this invention.

FIG. 3 shows an example of a first embodiment of the invention. B is the battery to be charged through the charging device according to this invention.

The primary winding 1 of a transformer $Tr$ is supplied from the power mains with an alternating current of given voltage.

The secondary winding 2 of the said transformer is designed to provide a voltage suitable for the battery to be charged, this voltage being rectified by the rectifier $Rd$ and filtered, by the condenser $C_1$, the voltage $U_{C1}$ is always a few volts higher than the voltage of the battery to be charged.

The rectifier $Rd$, shown in the diagram as a bridge of dry rectifiers, rectifies both waves, but as an alternative may be connected as a bivalve circuit with a middle point in the transformer secondary winding and thus can also rectify both waves. The rectifier can also comprise a single diode rectifying only one wave but in this case the condenser $C_1$ must have a higher capacity in order to have the same filtering efficiency.

The charging control device $Ch$ which takes up this filtered constant or direct current supply comprises in one hand, a voltage control device of an already known type comprising a transistor $T_1$, Zener a diode Z and resistors $R_2$ and $R_3$ connected, as shown, and on the other hand an automatic cut-off device to end the charge, according to the invention, and comprising a resistor $R_1$, a silicium transistor $T_2$, a germanium diode $D_1$ fed through a resistor $R_4$, and a condenser $C_2$, these components being respectively connected as shown in FIG. 1.

Such a device operates as follows:

The filtered constant (D.C.) current, supplied from transformer $Tr$, rectifier $Rd$ and condenser $C_1$ charge the battery B through a resistor $R_1$ and the transistor $T_1$. The voltage is $U_B$ at the battery terminals.

The charging current received by the battery depends on the state of the transistor $T_1$ with two extreme limits as follows:

Saturated: low voltage drop, when charging current is high;

Turned off: high voltage drop, when charging current is nearly non-existent.

The apparent resistance of transistor $T_1$ depends on the bias voltage across its emitter $e_1$ and its base $b_1$, i.e. of the voltage:

$$(U_z+U_{R3})-U_{Battery}$$

$U_z$ being the voltage at the terminals of the Zener diode Z.

Assuming that the transistor $T_2$ is conductive, the Zener diode Z is energized by the filtered rectified voltage $U_{C1}$ through resistors $R_2$ and $R_3$.

Owing to its specific properties, the voltage $U_z$ remains constant for any value of the current passing through the Zener diode Z (Zener voltage).

The voltage $U_{R3}$ varies proportionally with the current passing through Z; however, its relative value compared to $U_z$ is very small (since $R_3$ is only used to compensate the Zener diode manufacturing tolerance with a voltage which can be ±5%, for instance from one sample to another) so that the base $b$, voltage has a given value. Therefore, it can be assumed that the voltage $(U_z+U_{R3})$ remains substantially constant.

Considering the three steps of the charging process mentioned above, the device operates as follows:

During the first step (battery in the discharged state), the voltage $U_B$ is low, the transistor $T_1$ is thus strongly biased and its apparent resistance is low. Therefore, the charging current received by the battery is only limited by the resistor $R_1$ and the ohmic resistances of the transformer $Tr$ and rectifier $Rd$. The charge can thus be considered as effected at a substantially constant rate corresponding to the maximum current output $I_{max}$ of the charger which can be designed to supply a current which, expressed in amperes represents, for instance, one tenth of the battery's faradaic capacity expressed in ampere-hours (C/10).

When the battery voltage $U_B$ increases, the bias of transistor $T_1$ decreases and its apparent resistance increases. Thus, the charge will proceed at a limited and substantially constant voltage depending on the Zener voltage of diode Z. This corresponds to the second step of the process.

During the first two steps, the Zener diode Z has been assumed to receive some current, i.e. that transistor $T_2$ then being conductive.

In fact, the transistor $T_2$ is biased across its emitter $e_2$ and its base $b_2$ by the voltage $(U_{R1}+U_{D1})$, $U_{R1}$ being the voltage drop in a part of resistor $R_1$ due to the charging current, and $U_{D1}$ being the drop in the germanium diode $D_1$.

The transistor $T_2$ can be chosen such as to be conductive as soon as its bias is equal to or exceeds a fixed value, for instance, 0.6 volt. Thus, when the charging current is such that $(U_{R1}+U_{D1}) \geq 0.6$ v., transistor $T_2$ is conductive.

Alternatively, when $(U_{R1}+U_{D1})<0.6$ v., the transistor $T_2$ is turned off, then the critical value of the charging current $I_F$ is determined by $(U_{R1}+U_{D1})=0.6$ v. It can be seen that the hereabove defined voltage control device will become operative when the charging current exceeds $I_F$.

In the case of a lead-acid battery, the value of $I_F$ expressed in amperes can be selected, for instance, at C/50, C being the capacity of the battery expressed in ampere-hours.

Since the value of $I_F$ is known, the characteristics of the transistor $T_2$ and components $R_1$ and $D_1$ fixing the bias of the former can be adjusted so that the said transistor $T_2$ becomes non-conductive for this current value $I_F$.

Figure 4:
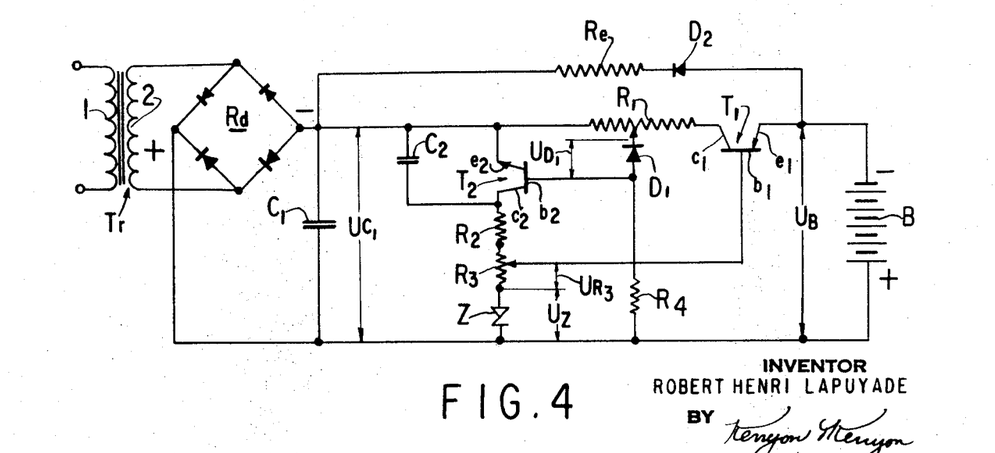
FIGS. 4, 5, 6, respectively show other variants of the embodiment of the device shown in FIG. 3.

However, as a variant, according to FIG. 4, a low and practically constant trickle charge current can still be supplied to the battery in order to balance capacity losses occurring when the battery is left at idle stand or in storage in a charged state. This current flows in a circuit shunting either the transistor $T_1$ between emitter $e_1$ and collector $C_1$, or the transistor $T_1$ and the resistor $R_1$ as shown in FIG. 4. This circuit comprises a resistor $Re$ and a diode $D_2$ connected as shown in the figure, so that the battery B cannot discharge in the circuit resistor $R_4 \rightarrow$ transistor $T_2 \rightarrow$ resistor $Re$ in the event of rectified current supply failure.

Figure 5:
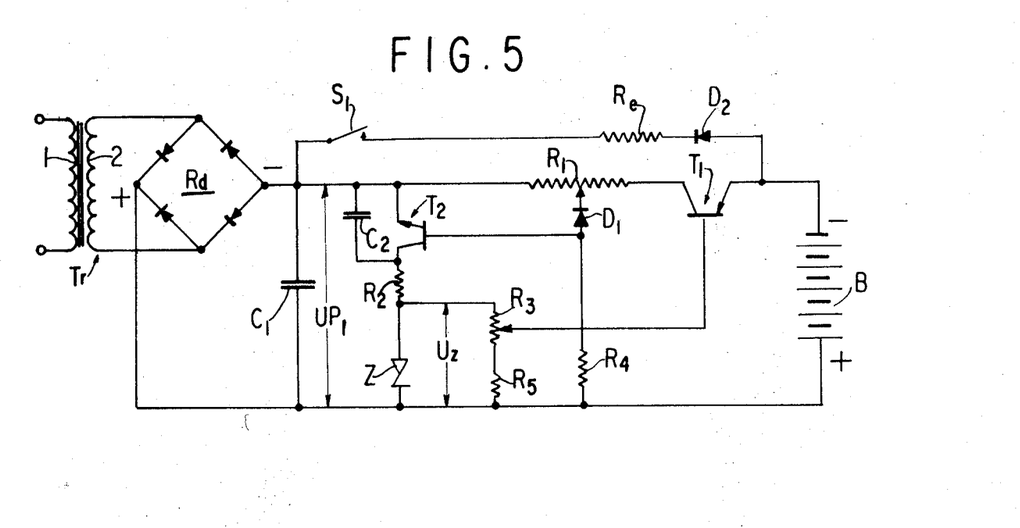
Figure 6:
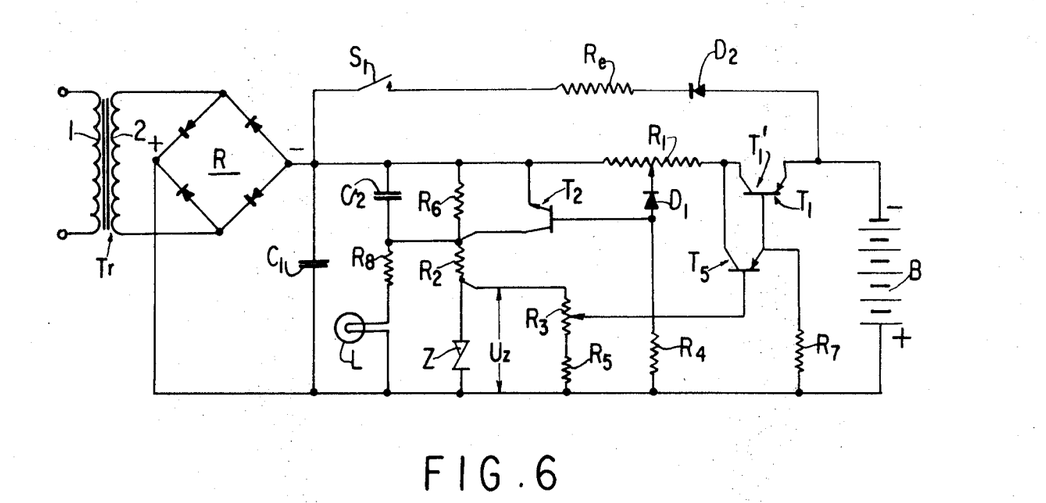

In FIGS. 5 and 6, the trickle charge circuit has been shown in open circuit for reasons of simplification, although it could be used in the same way by closing switches $S_1$. (In this case, as soon as the charging current is equal to $I_F$, the transistor $T_1$ is turned off and the battery will no longer be supplied with filtered rectified current).

It must be noted that the use of diode $D_1$ is of advantage in the devices of FIGS. 3 to 6. Should the transistor $T_2$ base $b_2$ be directly connected to resistor $R_1$, this resistor would be shunted by the base-emitter diode of $T_2$, through which the bulk of the charging current, i.e. a current of high value, would flow.

The presence of the said diode $D_1$, therefore, permits avoidance of oversizing the transistor $T_2$ and this represents a first advantage.

In addition, diode $D_1$ with a voltage drop of 0.3 volt, for instance, allows for a reduction to half-value of the resistance $R_1$, and thus prevents a too high voltage drop in this resistor, which would otherwise be inadequate when the charger delivers its maximum output. This is a second advantage.

A third advantage of diode $D_1$ is its compensation of temperature effects on the $I_F$ value.

It is known, that the bias voltage of transistor $T_2$ decreases when its temperature increases, resulting in a proportional decrease of $I_F$ value.

Now taking into account the characteristics of the batteries, it is desirable to increase, or at least not to decrease $I_F$ when the temperature rises. The presence of diode $D_1$ makes this possible. The temperature coefficient of this diode is negative i.e. the voltage $U_{D1}$ decreases if the temperature increases and the required compensation is thus ensured.

It must be noted that when the charger is switched on, the transistor $T_2$ is non-conductive, and since transistor $T_1$ is also non-conductive, charging would not start. However, the condenser $C_2$ is provided in order to ensure the triggering or starting of the charger as soon as the transformer $T_r$ is energized.

The charging of condenser $C_2$ involves the passage of a current through the Zener diode Z and consequently the setting up of the charging current. Then, the charging current through $R_1$ keeps transistor $T_2$ conductive.

FIG. 5 shows a variant of the embodiment of the device shown in FIG. 3, providing a constant charging voltage for any value of the voltage at the mains.

With the circuit shown in FIG. 3, the voltage $U_{R3}$ is strongly affected by the variations of the voltage $U_{C1}$, especially when caused by the fluctuations of the main voltage.

Such variations of the voltage $U_{R3}$ which affect the absolute value of voltage at battery terminals, can be practically eliminated by using the circuit shown in the FIG. 5.

In this figure, the resistor $R_3$, used as before to compensate the differences observed from one Zener diode to another, is series-connected with a resistor $R_5$ across the terminals of Zener diode Z whose voltage is stable. Whatever are the variations of $U_{C1}$, the voltage $U_z$ at the Zener diode terminals will remain constant, therefore, $U_{R3}$ is also constant and the voltage applied to the battery is practically constant despite the fluctuations in voltage at the mains.

The circuits shown in FIGS. 3, 4 and 5 require a very high current gain transistor $T_1$ in order to secure the maximum charging current.

FIG. 6 shows another, more economical circuit. This circuit comprises as before a transistor $T_1'$ with standard characteristics (middle current gain) connected to a low power transistor $T_5$, as in the so-called "Darlington" circuit, the set of transistors $T_1'$ and $T_5$ acting as a single high gain transistor. The resistor $R_7$ is used to compensate any reverse current which would pass through $T_1'$ at high temperatures.

FIG. 6 shows also another improvement to the hereabove mentioned circuits of FIGS. 3 to 5. Considering the circuit diagrams of FIGS. 3 and 5, it can be seen that when the charging current becomes equal to $I_F$, the transistor $T_2$ is turned off and is submitted to a voltage equal to the maximum voltage at condenser $C_1$, terminals, i.e. $U_{C1}$.

In order to use a transistor $T_2$ of lower voltage, it may be advantageous to connect across the terminals of $T_2$ a resistor $R_6$ constituting with $R_2$, $R_3$ and $R_5$ a voltage divider limiting the voltage applied to $T_2$. This disposition is also shown in FIG. 6.

As for a charging signal means or light, such as lamp L can be series-connected to a resistor $R_8$, in parallel with $R_2$ and Zener diode Z and supplied from transistor $T_2$. The extinction of this lamp will indicate that charging has stopped.

The resistor $R_8$ is provided to limit current drain on the lighting of the lamp L.

The charging devices as shown in the circuits of FIGS. 7 to 12 operate in a similar but improved manner to that shown in FIG. 3. The improvements have been effected to derive a sharper and more reliable operation.

Figure 7:
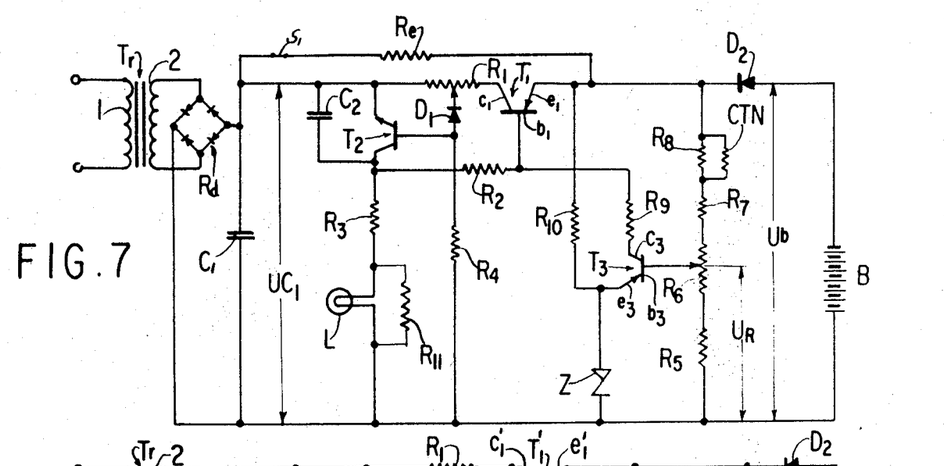
FIG. 7 is a diagram of a further improved charging device according to the invention.

Thus, as shown in FIG. 7, this charging device supplied with filtered constant current, as before, from the A.C. mains comprises both a charging voltage control device and an automatic end of charge cut-off device, the different parts being connected as shown in the figure.

The charging voltage control device is essentially constituted by a main transistor $T_1$, a voltage divider comprising resistors $R_5$, $R_6$, $R_7$, $R_8$, and CTN in parallel with $R_8$ (CTN referring to a resistor with a negative temperature coefficient), a Zener diode Z (supplied through a resistor $R_{10}$) and additional transistor $T_3$ on the base $b_3$ of which is applied an adjustable regulating voltage $U_R$ tapped from the voltage divider.

The automatic end of charge cut-off device is essentially constituted by the variable resistor $R_1$, a silicium transistor $T_2$ supplied through a signal device such as a lamp L (which may be shunted by a resistor $R_{11}$) and a resistor $R_3$, a germanium diode $D_1$ supplied through a resistor $R_4$, and a condenser $C_2$ connected between the emitter $e_2$ and the collector $c_2$ of transistor $T_2$.

The base $b_1$ of transistor $T_1$ is connected to the collector $c_2$ of transistor $T_2$ through a resistor $R_2$, and to the collector $c_3$ of transistor $T_3$ through a resistor $R_9$. The emitter $e_1$ of transistor $T_1$ is connected to the negative output terminal of the rectifier $Rd$ through a resistor $Re$ so as to by-pass resistor $R_1$ and transistor $T_1$.

A diode $D_2$ is provided between the charger and the battery in order to prevent the latter from discharging into the charger after charging has been stopped.

The voltage applied to the base $b_1$ of transistor $T_1$ depends on the state of transistor $T_2$ (as will be seen hereafter) and of transistor $T_3$. The latter is biased across emitter $e_1$ and base $b_1$ by a voltage $(U_z + U_J) - U_R$, $U_z$ being the voltage of Zener diode Z, $U_J$ being the voltage drop in the emitter $e_3$-base $b_3$ junction of transistor $T_3$.

Thus, the three following steps can be defined in the charging process:

(1) During the first step (battery in the discharged state), voltage $U_B$ is low, therefore, $U_z + U_J > U_R$ and transistor $T_3$ is non-conductive and transistor $T_1$ is strongly biased and its apparent resistance is therefore very low. The charging current I received by the battery then is only limited by resistor $R_1$ and the ohmic resistances of transformer $Tr$ and rectifier $Rd$. Therefore, the charge can be considered as effected at a substantially constant intensity corresponding to the maximum output of the charger, and the charger can be designed to deliver a current expressed in amperes equal to, for instance, one tenth of the battery capacity $C/10$ expressed in amperes-hours. As the intensity I exceeds $I_F$, transistor $T_2$ is also conductive.

When the battery voltage $U_B$ increases, the $U_z+U_J$ value drops below $U_R$. Transistor $T_3$ is progressively biased and allows the passage of a current reducing the transistor $T_1$ bias. The apparent resistance of the latter increases and thus the charge proceeds at appreciably constant limited voltage depending on the value of the Zener diode Z and the value of the control voltage $U_R$. The intensity I of the charging current progressively decreases but remains higher than $I_F$. As a consequence, transistor $T_2$ is kept conductive.

Towards the end of the charging process, the intensity I of the charging current decreases to the critical value $I_F$ determined as noted hereinabove. Transistor $T_2$ then turns off and in such conditions transistor $T_1$ is reversely biased and also turns off.

The charging current is then cut off, except for the trickle current flowing through resistor $Re$ connected between the emitter of transistor $T_1$ and the negative output terminal of the rectifier.

When the charger is switched on, the resulting charging of condenser $C_2$ causes a flow of current through the circuit $L-R_3-C_2$, for an extremely short time, which is, nevertheless, sufficient immediately to bias transistor $T_1$ triggering it and thus allowing the passage of the charging current. Transistor $T_2$ is then kept biased by the passage of this charging current through resistor $R_1$ so that it is kept conductive.

The presence of a signal or tell-tale lamp L in the circuit of transistor $T_2$ has the advantage of showing the occurrence of charging cut-off by the extinction of the lamp. It is also through this lamp L that transistor $T_1$ is reversely biased, confirming that charging is cut-off and preventing any untimely recharging which could result, for instance, from the temperature effects on transistor $T_1$. The resistor $R_{11}$ parallel connected across the lamp L makes the device reliable, even in the case of lamp failure.

It is to be noted that the presence of resistor Re allows the passage of a low trickle current, keeping the battery in the charged state even when transistor $T_1$ is turned off.

With this trickle rate, intended for compensating the losses due to local chemical or electrochemical reactions occurring in a battery during idle or storage, it is possible to put the fully charged battery into service at any moment.

By using one (or several) resistors of the CTN type, it is possible to compensate the sometimes considerable effect of temperature variations on the operative characteristics of the transistors or on the capacity of the battery.

By this trickle means, in all cases, a battery will be kept fully charged, without either overcharging beyond a permissible capacity or, on the contrary, undercharging below the optimum capacity.

It should be clear that the resistor Re provided to shunt resistor $R_1$ and transistor $T_1$ can also be connected between emitter $e_1$ and collector $C_1$ of transistor $T_1$ which is consequently shunted. It should also be clear that the resistor Re can be omitted when the charger must be wholly cut-off as by opening of switch $S_1$.

Figure 8:
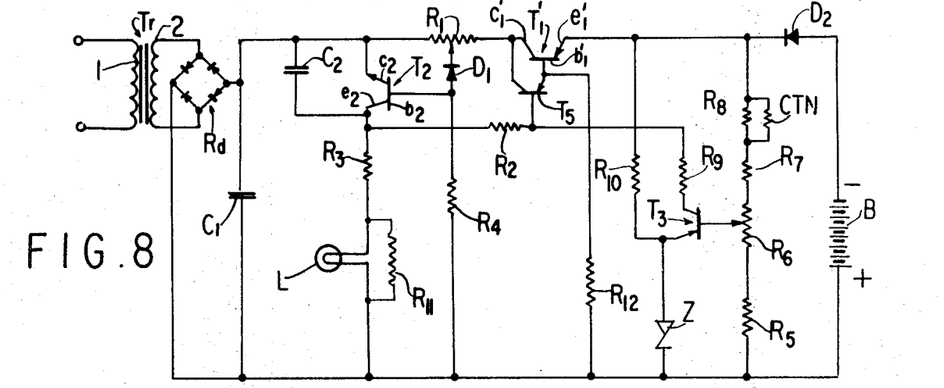
FIGS. 8 and 9 show other variants of the device shown in FIG. 7.

The circuit shown in FIG. 8 mainly differs from the circuit in FIG. 7, in that the main transistor instead of being constituted of a single unit having a high current gain, is constituted of a compound transistor $T_1'-T_5$ comprising a middle gain transistor $T_1'$ connected to a low power transistor $T_5$ according to the so-called Darlington circuit. Resistor $R_{12}$ is used to compensate the reversed current which would cross transistor $T_1'$ at high temperatures. This variant might be economically advantageous.

FIG. 8 has been designed for the case of a total cut-off at the end of charging. It should be clear that when a trickle charging current is desired, a suitable resistor Re may be used to shunt either resistor $R_1$ and transistor $T_1'$, or transistor $T_1'$ alone.

Figure 9:
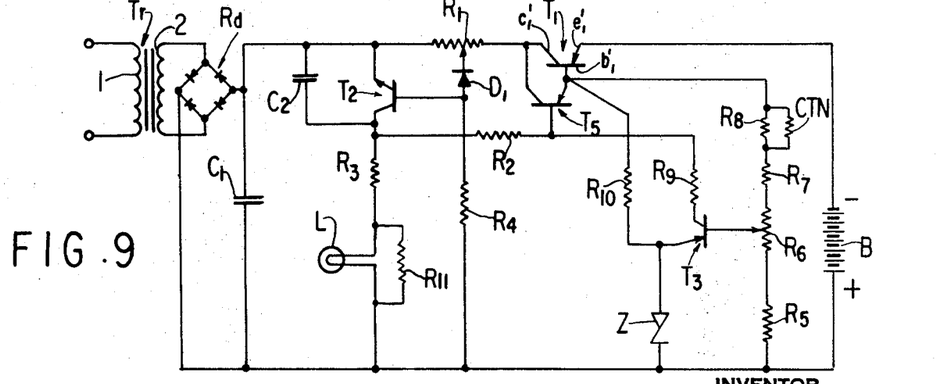

FIG. 9 shows a further variant of the two preceding circuits where the voltage divider $R_5-R_6-R_7-R_8$ CTN and the Zener diode circuit $R_{10}-Z$ are not connected to the emitters of the main transistor $T_1'$, but to the point common to the transistor $T_5$ emitter $e_5$ and the transistor $T_1'$ base. According to this invention, this embodiment offers the advantage of preventing the battery from any discharge through the charger components when the charge is cut-off, thus permitting one to omit diode $D_2$.

FIG. 9 is also designed for effecting total cut-off of the charging current.

It should also be clear that when a trickle charge current is desired, a suitable resistor Re may be used to shunt either resistor $R_1$ and transistor $T_1'$ or transistor $T_1'$ alone, but in this case a diode like $D_2$ must be inserted in the shunt circuit and series-connected to resistor Re, in order to prevent the battery from discharging into the charger circuit. The said diode must be connected in the same direction as diode $D_2$ of FIG. 8.

Figure 10:
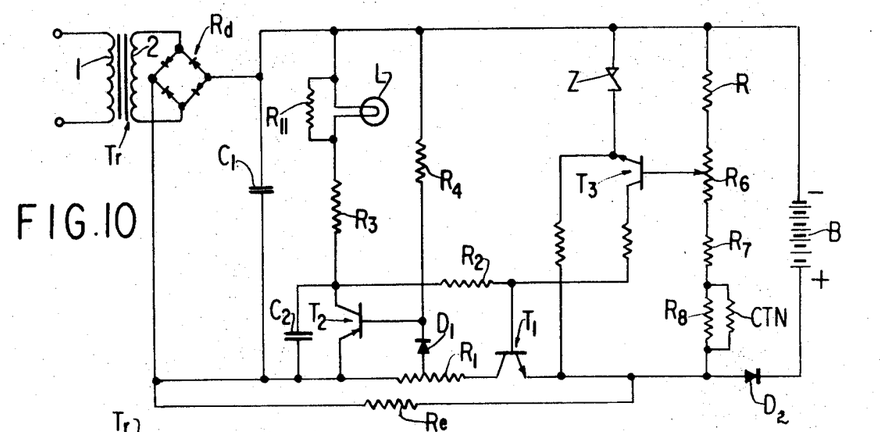
FIGS. 10, 11 and 12 respectively correspond to FIGS. 7, 8 and 9 wherein n-p-n transistors are used instead of p-n-p transistors of the latter and conversely.
Figure 11:
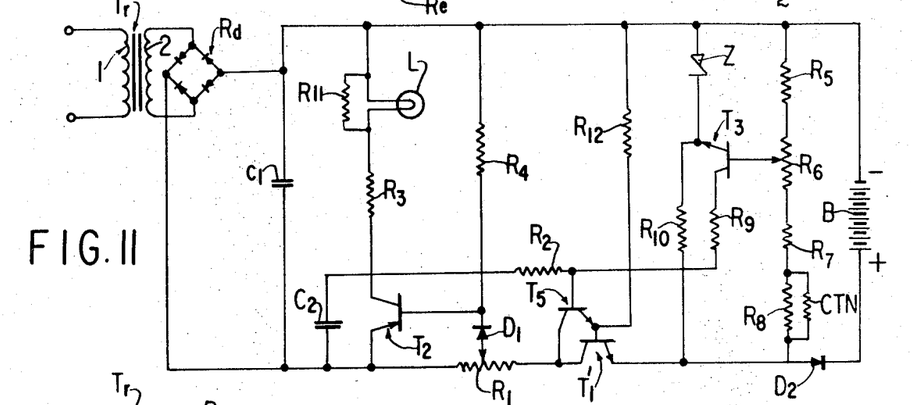
Figure 12:
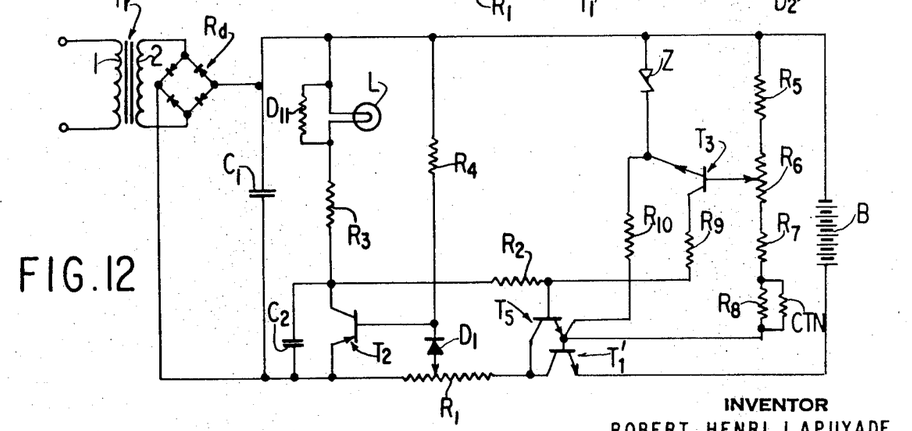

FIGS. 10, 11 and 12 are variants of the circuits according to the invention, where the dispositions are as shown in FIGS. 7, 8 and 9, except that the p-n-p transistors of FIGS. 7, 8, 9 have been replaced by n-p-n transistors. Otherwise, the operations of the circuits of these figures correspond to those of FIGS. 7, 8 and 9.

Figure 13:
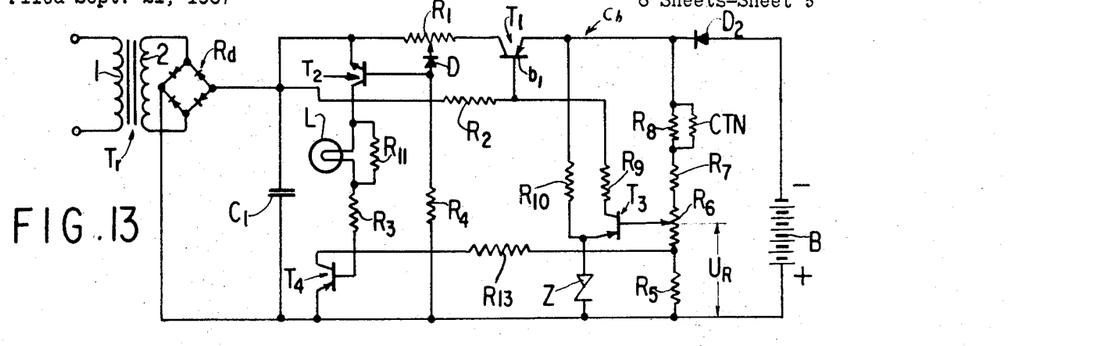
FIG. 13 is a diagram of a further charging device according to the invention, involving the charging process shown in FIG. 1.

The charging device shown in FIG. 13 is supplied from power means as a filtered rectified current source as in the earlier described modifications and comprises a charging voltage control device $Ch$ and an automatic device for modifying the voltage plateau at the end of the charge, the various parts composing this device being connected as shown in the figure.

In addition to the advantage of simplicity, these dispositions of this figure are essentially advantageous for effective sharp transitions from first to second step and from second step to third step of the charging process.

The charging voltage control device $Ch$ essentially comprises the main transistor $T_1$, conducting the charging current to the battery B through its emitter $e_1$ and collector $c_1$, the voltage divider $R_5-R_{13}$, $R_6$, $R_7$, $R_8$, CTN, (CTN referring to a resistor with a negative temperature coefficient), the Zener diode Z (supplied through resistor $R_{10}$), and the transistor $T_3$, to the base $b_2$ of which is applied an adjustable control voltage $U_R$ taken from the voltage divider. Resistors $R_5$ and $R_{13}$ are parallel-connected, the resistor $R_{13}$ being supplied through the path of emitter $e_1$—collector $c_4$ of a transistor $T_4$ which may be either turned on or off, as will be explained hereinafter.

The device for modifying automatically the voltage plateau at the end of charge essentially comprises an adjustable resistor $R_1$, a silicium transistor $T_2$ and a germanium diode $D_1$. Transistor $T_2$ is supplied through a circuit comprising the emitter $e_4$-base $b_4$ of transistor $T_4$, a resistor $R_3$ and a lamp L, which may be shunted by a resistor $R_{11}$. The diode $D_1$ is supplied through a resistor $R_4$.

The base $b_1$ of transistor $T_1$ is connected to the negative output terminal of the rectifier $Rd$ through a resistor $R_2$ and to the collector $c_3$ of transistor $T_3$ through a resistor $R_9$.

A diode $D_2$ is connected between the charger and the battery and is used to prevent the battery from discharging into the charger components when the charge has been cut-off.

It is to be noted that, according to whether the resistor $R_{13}$ is connected or not to the circuit, in other words depending on transistor $T_4$ being turned on or off, the regulating voltage $U_R$ has a first value $U_1$ or a second value $U_2$, defining two different bias levels for transistor $T_3$. The state of transistor $T_4$ itself depends on the state of transistor $T_2$. When transistor $T_2$ is conductive, a current passes through the circuit comprising the emitter $e_4$-base $b_4$ (directly supplied) of transistor $T_4$, resistor $R_3$, lamp L and the path emitter $e_2$-collector $c_2$ of transistor $T_2$. Transistor $T_4$ is designed so that the voltage drop resulting from the passage of this current through its emitter $e_4$-base $b_4$ junction is sufficient to swing it to the conductive or saturated state. Conversely, when transistor $T_2$ is turned off, the transistor $T_4$ bias is suppressed and thus transistor $T_4$ also become non-conductive.

Therefore, the bias level of transistor $T_3$ depends ultimately on the transistor $T_2$ state, either conductive or non-conductive.

This charging device of FIG. 13 operates as follows:

The filtered rectified current supplied from $Tr$, $Rd$ and $C_1$, charges the battery through resistor $R_1$ and transistor $T_1$. The voltage across the battery terminals is termed $U_B$.

Transistor $T_2$ is biased across its emitter $e_2$ and base $b_2$ by a voltage $U_{R_1}+U_{D_1}$, $U_{R_1}$ being the voltage drop due to the passage of the charging current, through a part of $R_1$ and $U_{D_1}$ being the voltage drop across the germanium diode $D_1$.

Transistor $T_2$ can be selected such that it becomes conductive as soon as its bias reaches or exceeds a predetermined value, e.g. 0.6 volt, and non-conductive in the opposite case as already explained.

The charging current received by the battery B then depends upon the state of the main transistor $T_1$.

The apparent resistance of this transistor $T_1$ depends on the bias voltage applied across its emitter $e_1$ and its base $b_1$, i.e. on the difference between the voltage $U_B$ (which varies during the charge at the battery terminals and the voltage applied to the base $b_1$ of this transistor). This last voltage itself depends on the state of transistor $T_3$, biased between its emitter $e_1$ and its base $b_1$ by a voltage $(U_z+U_j)-U_R$, $U_z$ being the constant Zener voltage of Zener diode Z, $U_j$ being the voltage drop in the emitter $e_3$-base $b_3$ junction of this transistor and $U_R$ being the above-mentioned control voltage.

The value of the control voltage $U_R$ depends on the one hand on $U_B$ and on the other hand, on the switching on or off of resistor $R_{13}$, i.e. on the state of transistor $T_4$ itself depending on the state of transistor $T_2$, as already explained.

Therefore, the following steps can be defined in the charging process:

During the first step (battery in the discharged state) voltage $U_B$ is low, thus $U_z+U_j>U_R$. Thus, transistor $T_4$ is non-conductive and transistor $T_1$ is strongly biased throught resistor $R_2$. Its apparent resistance is then very low. The charge can then be considered as being effected at substantially constant intensity $I_{max}$ corresponding to the maximum output the charger, as has been already defined.

Since the intensity $I_{max}$ exceeds $I_F$, transistor $T_2$ is conductive, and consequently, so is transistor $T_4$.

The voltage $U_B$ across the battery terminals progressively increases. The intensity I of the charging current begins to decrease as the internal resistance of the battery increases, but its value remains higher than $I_F$. Transistors $T_2$ and $T_4$ are, therefore, kept conductive. Resistor $R_{13}$ is in the circuit and the control voltage $U_R$ takes the hereinabove defined value $U_R$. When $U_z+U_j<U_R$, transistor $T_3$ is progressively biased and allows the passage of a current reducing the bias of transistor $T_1$. The apparent resistance of the transistor increases, so that the charge proceeds at a substantially constant limited voltage, $V=V_1$ depending on the selection of the Zener diode Z and on the value of the control voltage $U_R=U_1$.

The intensity I of the charging current still decreases and reaches the critical value $I_F$ already determined.

Transistor $T_2$ turns off and simultaneously turns off the transistor $T_4$, so that the resistor $R_{13}$ is suppressed from the voltage divider, the control voltage $U_R$ takes a second value $U_2$. Consequently, the bias of transistor $T_3$ will sharply rise, the result being the correlative decrease of transistor $T_1$ bias whose apparent resistance therefore increases. The charge proceeds then at a lower limited voltage $V=V_2$ depending on the value of the Zener diode and on the new value of the control voltage $U_R=U_2$.

The intensity of the charging current is then extremely low, a trickle current, but it is sufficient to maintain the battery in a fully charged state compensating for its slow discharge occurring at idle or storage caused by local chemical and electrochemical reactions. Nevertheless, such a trickle current is not sufficiently high to overcharge the battery with resultant gas evolution on the electrodes.

When switching on the charger, transistors $T_2$ and $T_4$ are non-conductive so that the charge will start at the trickle rate.

The passage of the charging current through resistor $R_1$ biases transistor $T_2$ so that it is maintained in the conductive state.

As soon as transistor $T_2$ is biased, a current flows through the emitter $e_4$-base $b_4$ junction of transistor $T_4$ which is then biased, and the resistor $R_{13}$ is again actively inserted in the voltage divider, so that the charger works at the first voltage plateau corresponding to the normal charging voltage of the battery.

The presence of a tell-tale lamp L in the transistor $T_2$ circuit has the advantage of showing the occurrence of charge cut-off by extinction of the lamp. The resistor $R_{11}$ which is parallel-connected across the lamp L makes the device reliable even in the case of lamp failure.

By using the one (or several) resistors of CTN type, it is possible to compensate sometimes for the considerable effects of temperature variations on the operative characteristics of the transistors and on the capacity of the battery.

By this arrangement, in any case, the battery is kept fully charged, without risking excessive overcharging or, on the contrary, of undercharging below its optimum capacity.

Figure 14:
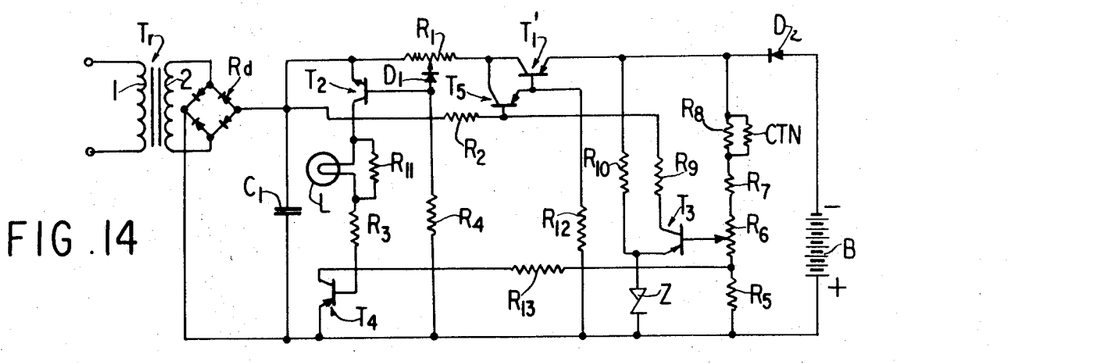
FIGS. 14 and 15 show other variants of the device shown in FIG. 13.

The circuit shown in FIG. 14 mainly differs from that of FIG. 13 in that the main transistor instead of being composed of a single unit with high current gain, is composed of a compound transistor $T_1'-T_5$ comprising a middle gain transistor $T_1'$ and a low power transistor $T_5$ according to the so-called Darlington circuit. Resistor $R_{12}$ then is used to compensate for the reversed current which would flow through $T_1'$ at high temperature. This variant might be economically advantageous.

Figure 15:
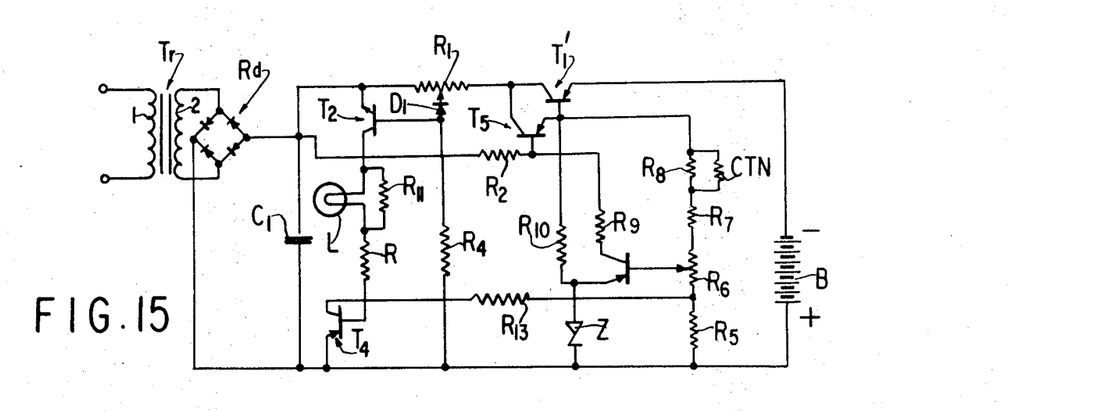

FIG. 15 shows a variant of the two preceding circuits of FIGS. 13 and 14 when the voltage divider $R_5-R_{13}-R_6$, $R_7$, $R_8$, CTN, and the Zener diode circuit $R_{10}-Z$ are not connected to the emitter of the main transistor $T_1'$ but to the point common to the transistor $T_5$, emitter $e_5$, and the transistor $T_1'$, base $b_1$ This embodiment offers the additional advantage of preventing the battery from discharging through the charger components when the charger has been cut-off, and consequently, it permits omission of the diode valve $D_2$.

Figure 16:
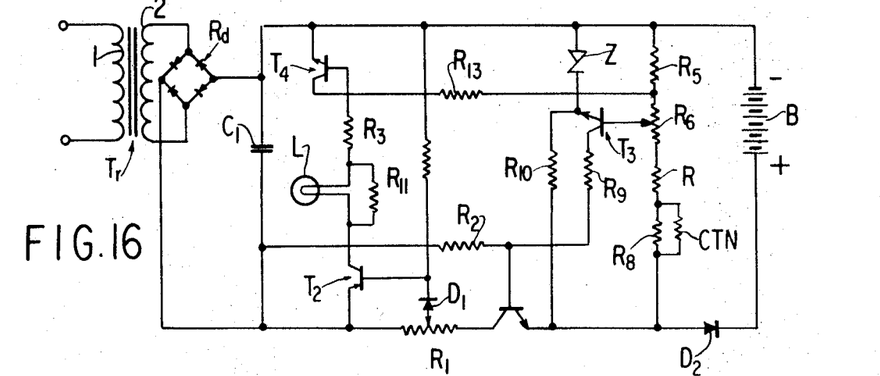
FIGS. 16, 17 and 18 respectively correspond to FIGS. 13, 14 and 15 wherein n-p-n transistors are used instead of p-n-p transistors of the latter and conversely.
Figure 17:
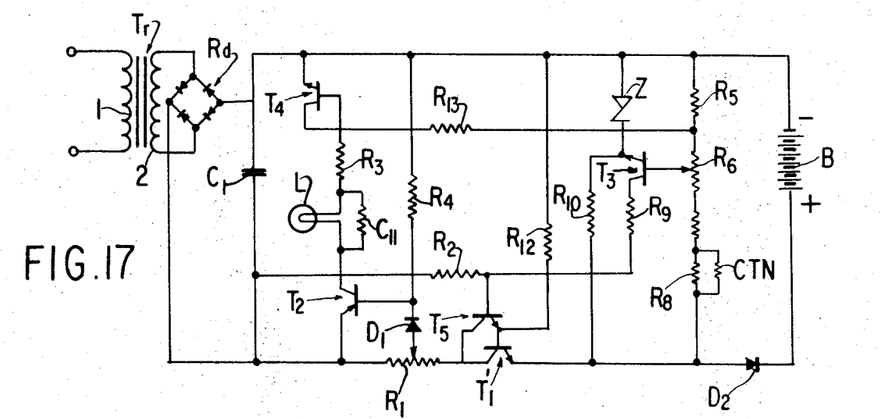
Figure 18:
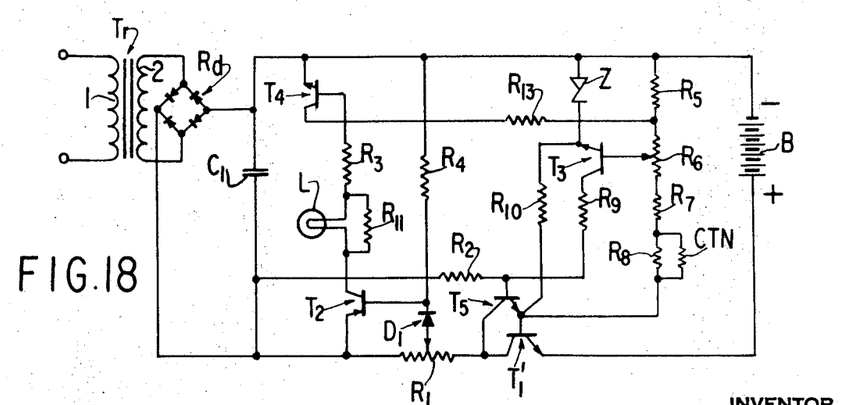

FIGS. 16, 17 and 18 are variants of the circuit according to the invention, corresponding to the dispositions shown in FIGS. 13, 14 and 15 except that the p-n-p transistors of FIGS. 13 to 15 are replaced by n-p-n transistors. Operation of the respective circuits is substantially like those of respective FIGS. 13, 14 and 15.

While specific embodiments of the invention have been disclosed and shown, variations in detail within the scope of the appended claims are possible and are contemplated. There is no intention, therefore, of limitation to the exact disclosure or abstract hereinabove presented.

What is claimed is:

1. A programmed charging device for a rechargeable electrochemical generator enabling its operation under substantially sealed conditions comprising rectifying means for supplying rectified and filtered charging current from an alternating current source, a first circuit interconnected between said rectifier means and said generator and including a first transistor means with a base and an emitter-collector path for supplying said charging current to said generator, a second circuit parallel connected to the first circuit and including a second transistor means with a base and emitter-collector path providing a biasing voltage to the first transistor means, said biasing voltage varying during charging of the generator and depending on the variable voltage across said generator during its charging which is applied to the emitter of the first transistor means, and also depending on a second variable voltage taken from a point of said second circuit and applied to the base of said first transistor means so that the apparent resistance of said first transistor means varies during said charging, said second transistor means being biased across its emitter and base by a voltage dependent upon the intensity of the charging current so as to swing it from a first extreme operating state to a second extreme operating state as soon as the intensity of the charging current falls below a predetermined critical value, and an interconnecting circuit between the two transistor means so that said swinging of said second transistor means from one of its extreme operating states to the other causes said first transistor means to swing from a conductive state towards a state of high apparent resistance as the result of a sharp modification of said biasing voltage which is applied to said base of said first transistor means, said second circuit from which said second variable voltage is derived comprising the emitter-collector path of said second transistor means, a resistor series connected in said emitter-collector path of said second transistor means and a Zener diode.

2. A programmed charging device for a rechargeable electrochemical generator according to claim 1, wherein said Zener diode is series-connected to said resistor.

3. A programmed charging device for a rechargeable electrochemical generator according to claim 1, including said resistor and Zener diode are series-connected in said emitter-collector path of said second transistor means and connections from an intermediate point of said resistor for taking off and applying said second variable voltage to said base of said first transistor means.

4. A programmed charging device for a rechargeable electrochemical generator according to claim 1, including said resistor series-connected in said path of said second transistor means and said Zener diode parallel-connected to at least part of said resistor.

5. A programmed charging device for a rechargeable electrochemical generator according to claim 1, including said resistor series-connected in said emitter-collector path of said second transistor means, said Zener diode means being parallel-connected to at least part of said resistor, and connections from an intermediate point of that part of said resistor that is parallel-connected with said Zener diode for taking off and applying said second variable voltage to said base of said first transistor means.

6. A programmed charging device for a rechargeable electrochemical generator according to claim 1, including a third transistor means having a base and an emitter-collector path, a third circuit including said Zener diode and a resistor, said Zener diode being connected to said last-named emitter and being supplied by said last-named resistor, and connection from the collector of said third transistor means for applying said second variable voltage to the base of said first transistor means.

7. A programmed charging device for a rechargeable electrochemical generator according to claim 6, including a voltage divider connected across the terminals of said electrochemical generator and means for biasing said third transistor means with a voltage varying during charging of said generator and dependent on the voltage yielded by the Zener diode and applied to the emitter of said third transistor means and on an adjustable voltage taken from said voltage divider and applied to the base of said third transistor means so that the latter is maintained in non-conductive state as long as the terminal voltage of said electrochemical generator remains low, thus permitting a maximum bias of said first transistor means and so that said third transistor means becomes progressively conductive during charging, thus progressively modifying said second variable voltage that is applied to said base of said first transistor means.

8. A programmed charging device for a rechargeable electrochemical generator according to claim 7, wherein said voltage divider comprises several resistors at least one of which has a negative temperature coefficient.

9. A programmed charging device for a rechargeable generator according to claim 7, including a fourth transistor means having a base and an emitter-collector path and wherein said voltage divider comprises at least two parallel connected branches each comprising at least one resistor, one of said branches also including said last-named emitter-collector path so that the conductive or non-conductive state of said fourth transistor means respectively switches on or off the resistor in said one of said branches and as a consequence sharply modifies the value of the adjustable voltage applied to said base of said third transistor means, and correlatively the second variable voltage applied to said base of said first transistor means.

10. A programmed charging device for a rechargeable electrochemical generator according to claim 9, wherein said voltage divider comprises several resistors at least one of which has a negative temperature coefficient.

11. A programmed charging device for a rechargeable electrochemical generator enabling its operation under substantially sealed conditions comprising rectifying means for supplying rectified and filtered charging current from an alternating current source, a first circuit interconnected between said rectifier means and said generator and including a first trasistor means with a base and an emitter-collector path for supplying said charging current to said generator, a second circuit parallel connected to the first circuit and including a second transistor means with a base and emitter-collector path providing a biasing voltage to the first transistor means, said biasing voltage varying during charging of the generator and depending on the variable voltage across said generator during its charging which is applied to the emitter of the first transistor means, and also depending on a second variable voltage taken from a point of said second circuit and applied to the base of said first transistor means so that the apparent resistance of said first transistor means varies during said charging, said second transistor means being biased across its emitter and base by a voltage dependent upon the intensity of the charging current so as to swing it from a first extreme operating state to a second extreme operating state as soon as the intensity of the charging current falls below a predetermined critical value, and an interconnecting circuit between the two transistor means so that said swinging of said second transistor means from one of its extreme operating states to the other causes said first transistor means to swing from a conductive state towards a state of high apparent resistance as the result of a sharp modification of said biasing voltage which is applied to said base of said first transistor means, including second transistor means and fourth transistor means in said second circuit, said second and fourth transistor means being interconnected so that swing of said second transistor means from one extreme operating state to another state causes swinging of said fourth transistor means and consequently a sharp modification of the apparent resistance of said first transistor means.

12. A programmed charging device for a rechargeable electrochemical generator according to claim 11, comprising means for effecting interconnections between said second and fourth transistor means so as to close said second circuit means through the emitter-base path of said fourth transistor means constituting a directly supplied diode in said path.

13. A programmed charging device for a rechargeable electrochemical generator according to claim 1, including a resistor series-connected in said first circuit, the emitter and the base of said second transistor means being connected each to an end of said resistor so that biasing voltage from said second transistor is constituted at least partially by the voltage drop due to change in charging current passing through said resistor.

14. A programmed charging device for a rechargeable electrochemical generator according to claim 13, wherein said resistor is adjustable.

15. A programmed charging device for a rechargeable electrochemical generator according to claim 13 including an auxiliary circuit parallel-connected to said first circuit and comprising a resistor and a diode series-connected thereto, the voltage drop through said diode added to the voltage drop due to passage of charging current through at least a part of said resistor in said first circuit serving to bias said second transistor means.

16. A programmed charging device for a rechargeable electrochemical generator according to claim 15, wherein said resistor in said first circuit is adjustable.

17. A programmed charging device for a rechargeable electrochemical generator according to claim 15, wherein said diode has a negative temperature coefficient.

18. A programmed charging device for a rechargeable electrochemical generator according to claim 1, wherein said first transistor means comprises a set of two transistors one being a middle gain transistor and the other a low power transistor interconnected in a Darlington circuit.

19. A programmed charging device for a rechargeable electrochemical generator according to claim 18, wherein one terminal of a voltage divider and one terminal of a Zener diode circuit are connected together and to the middle gain transistor base.

20. A programmed charging device for a rechargeable electrochemical generator according to claim 1, including a resistor and signal means connected to indicate the passage of charging current to said generator.

21. A programmed charging device for a rechargeable electrochemical generator according to claim 1, including an additional resistor shunting said signal means.

22. A programmed charging device for a rechargeable electrochemical generator according to claim 1, including a condenser parallel connected across the emitter and collector of said second transistor means.

23. A programmed charging device for a rechargeable electrochemical generator according to claim 1, including a resistor connected to one terminal of said rectifying means and to the emitter of said first transistor means to permit passage of trickle-charging current from said rectifier means to said battery even when said first-named transistor means is in cut-off state.

24. A programmed charging device for a rechargeable electrochemical generator according to claim 1, including a resistor connected in shunt with the emitter and collector of said first-named transistor means to permit passage of trickle current to said battery even when said first-named transistor means is in cut-off state.

25. A programmed charging device for a rechargeable electrochemical generator according to claim 23 including a diode in series with said last-named resistor and connected to prevent discharge of said battery therethrough.

26. A programmed charging device for a rechargeable electrochemical generator according to claim 24, including a diode in series with said last-named resistor and connected to prevent discharge of said battery therethrough.

References Cited

UNITED STATES PATENTS

| | | | |
|---|---|---|---|
| 3,281,639 | 10/1966 | Potter et al. | 320—43 |
| 3,392,317 | 7/1968 | Eberts et al. | 320—23 |
| 3,412,308 | 11/1968 | Brown | 320—24 |
| 3,443,191 | 5/1969 | Medlar. | |

J D MILLER, Primary Examiner

JOHN M. GUNTHER, Assistant Examiner

U.S. Cl. X.R.

320—23, 39